US012023668B2

(12) United States Patent
Chmayssem et al.

(10) Patent No.: US 12,023,668 B2
(45) Date of Patent: Jul. 2, 2024

(54) FLUIDIC SYSTEM COMPRISING A FLUIDIC COMPONENT AND AN INSTRUMENTED DEVICE FITTED ON SAID COMPONENT

(71) Applicant: Commissariat à l'Energie Atomique et aux Energies Alternatives, Paris (FR)

(72) Inventors: Ayman Chmayssem, Grenoble (FR); Nicolas Verplanck, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 326 days.

(21) Appl. No.: 17/448,234

(22) Filed: Sep. 21, 2021

(65) Prior Publication Data

US 2022/0088597 A1 Mar. 24, 2022

(30) Foreign Application Priority Data

Sep. 21, 2020 (FR) ..................................... 20 09539

(51) Int. Cl.
*B01L 3/00* (2006.01)

(52) U.S. Cl.
CPC ..... *B01L 3/502715* (2013.01); *B01L 2300/06* (2013.01); *B01L 2300/0887* (2013.01); *B01L 2300/123* (2013.01); *B01L 2300/126* (2013.01)

(58) Field of Classification Search
CPC ........... B01L 3/502715; B01L 2300/06; B01L 2300/0887; B01L 2300/123; B01L 2300/126
USPC .................................................. 422/502, 500
See application file for complete search history.

(56) References Cited

U.S. PATENT DOCUMENTS

| | | | |
|---|---|---|---|
| 4,956,298 | A | 9/1990 | Diekmann |
| 2015/0360223 | A1 | 12/2015 | Ono et al. |
| 2020/0216789 | A1 | 7/2020 | Pizzi et al. |

OTHER PUBLICATIONS

French Preliminary Search Report dated Jun. 4, 2021 in French Application 20 09539 filed on Sep. 21, 2020, 9 pages (with English Translation of Categories of Cited Documents & Written Opinion).

*Primary Examiner* — Christine T Mui
(74) *Attorney, Agent, or Firm* — Oblon, McClelland, Maier & Neustadt, L.L.P.

(57) ABSTRACT

A fluidic system including a fluidic component in which is produced a fluidic circuit that includes at least a first aperture and a second aperture opening onto two separate regions of the component, and an instrumented device fitted on the fluidic component, the instrumented device including a first element fastened to the fluidic component to close the first aperture and a second element fastened to the fluidic component to close the second aperture, a deformable portion joining the first element to the second element, the first element and/or the second element being instrumented with at least one actuator and/or an effector arranged to interact with an internal volume of the fluidic circuit.

14 Claims, 8 Drawing Sheets

FLUIDIC SYSTEM COMPRISING A FLUIDIC COMPONENT AND AN INSTRUMENTED DEVICE FITTED ON SAID COMPONENT

TECHNICAL FIELD OF THE INVENTION

The present invention relates to a fluidic system that comprises a fluidic component and an instrumented device fitted on said fluidic component to interact with the internal volume of the fluidic circuit.

PRIOR ART

In the field of fluidic devices employed in biological applications, it is sought to measure certain characteristics of a fluid present in the device. Thus, impedance sensors, electrochemical sensors, thermal sensors, or sensors based on the principle of tomography are used.

These sensors or transducers may for example comprise two electrodes, which it is necessary to integrate into the fluidic component to perform the measurements.

It is known to integrate the electrodes into layers of the fluidic component thus allowing the component to be functionalized.

However, this architecture requires dedicated components to be manufactured, this not being optimal in terms of cost and of modularity. It is also possible to use devices external to the component but such devices often do not have an architecture matched to the fluidic component, making the performance of measurements impractical.

Patent application US2020/216789A1 describes a plate for culturing cells that comprises a plurality of culturing cavities, and a device fittable on the plate to compartmentalize the cavities.

The aim of the invention is to provide a fluidic system that comprises a fluidic component on which may easily be fitted an instrumented device capable of interacting with the internal volume of the component, this system being easy to manufacture, of a moderate cost and straightforward to use.

DISCLOSURE OF THE INVENTION

This aim is achieved via a fluidic system comprising a fluidic component in which is produced a fluidic circuit that comprises at least a first aperture and a second aperture opening onto two separate regions of the component, and an instrumented device fitted on said fluidic component, said instrumented device comprising:

a first element fastened to said fluidic component to close said first aperture and a second element fastened to said fluidic component to close said second aperture, a deformable portion joining the first element to the second element, the first element and/or the second element being instrumented with at least one actuator and/or an effector arranged to interact with an internal volume of the fluidic circuit.

According to one particularity, each actuator or effector comprises at least one functional unit chosen from an electrode, a light-emitting diode, an optical sensor, an electrical resistor, a thermistor.

According to another particularity, the functional unit of electrode type is produced in the form of a conductive ink.

According to another particularity, the system comprises an electrical connection point and an electrical conductor connecting said electrical connection point to each functional unit of the actuator or effector, said point and said conductor being distinct.

According to another particularity, each electrical conductor and each electrical connection point are produced in the form of a conductive ink.

According to one particular embodiment, the instrumented device comprises at least an elongate, supple, semi-rigid or articulated substrate bearing said first element at a first end and said second element at a second end.

According to one particularity, the first element and the second element are made of a conformable material, to fit to the shape of the fluidic component in its two regions.

According to another particularity, the deformable portion is produced in the form of at least one strip of material joining the first element to the second element.

According to one particular embodiment, the substrate comprising the first element, the second element and the deformable portion is produced in a single part, in the form of a strip of supple plastic material.

According to one particularity, the strip is made of a material chosen from polyethylene terephthalate, polyethylene naphthalate, KAPTON®, silicone, a polymer film, paper, and a fabric.

According to another particular embodiment, the substrate comprising the first element, the second element and the deformable portion comprises two flexible/supple, semi-rigid or articulated strips adhesively bonded to each other via a common portion and forming two strands each bearing, respectively, at their free end, the first element and the second element.

According to one particularity, each strip is made of a material chosen from PET, PEN, KAPTON®, silicone, a polymer film, paper, and a fabric.

According to another particularity, the fluidic component has a right slab shape and wherein the first aperture and the second aperture open onto two opposite faces.

According to one particular embodiment:

the fluidic component comprises two superposed layers, a first layer and a second layer, said fluidic circuit comprising a through-cavity that passes through the two layers, and that communicates on the one hand with the first aperture, and on the other hand with the second aperture, the instrumented device comprises an extension connected to its second element via a second deformable portion, said extension being arranged between the two layers of the component to form a membrane separating said cavity into two distinct spaces.

BRIEF DESCRIPTION OF THE FIGURES

Other features and advantages will become apparent in the following detailed description that is provided with reference to the appended drawings, in which.

DETAILED DESCRIPTION OF AT LEAST ONE EMBODIMENT

The invention relates to a fluidic system that comprises a fluidic component and an instrumented device 1 that is defined below.

The instrumented device 1 is intended to be fitted to the fluidic component 4.

Figure 1:
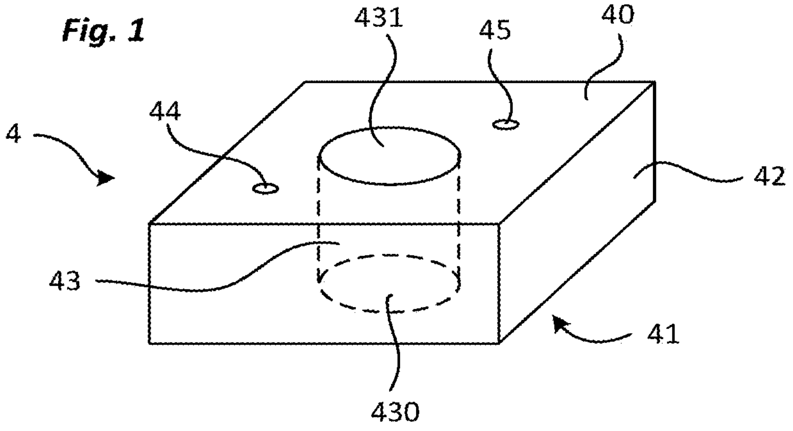
FIG. 1 shows a fluidic component of the fluidic system of the invention.

With reference to FIG. 1, the fluidic component 4 comprises a substrate in which is produced a fluidic circuit. This fluidic circuit may be relatively complex.

Non-limitingly, the substrate of the fluidic component 4 may take the form of a panel or of a board, having at least two opposite faces, which are advantageously parallel to each other, these faces being referred to as the upper face 40 and lower face 41, and a wall, referred to as the side wall 42, arranged between the two faces. Non-limitingly, its base may be rectangle or disk shaped. The substrate may of course take another form.

Its fluidic circuit may comprise a cavity 43, which is for example intended to be filled with a fluid 46. By way of example, the fluid may be a liquid, a gas or a gel or a mixture of a plurality of fluids. The cavity 43 could also be placed under vacuum.

The cavity 43 may be a through-cavity and open via a first aperture 430 onto its lower face and via a second aperture 431 onto its upper face.

The fluidic circuit of the component 4 may comprise two channels 44, 45 that each open, on the one hand, onto the exterior of the component 4, and on the other hand, into the interior of the cavity 43, allowing a fluid to be injected into the cavity. Non-limitingly, the two channels may for example open onto the upper face 40 of the component or onto its lateral wall 42.

With reference to FIGS. 2A, 2B and 4A, 4B, the instrumented device 1 advantageously comprises a supple, semi-rigid or articulated substrate having a thickness of a few μm. At rest, the substrate may have a flat architecture of two opposite planar faces, referred to as the upper face and lower face, and is elongate along a longitudinal axis (X), so as to have two ends. The substrate comprises at least one deformable intermediate portion 12 formed via the use of a supple or semi-rigid material or via an articulated assembly. By deformable, what is meant is that the substrate may have, at least in its intermediate portion, mechanical characteristics that allow it to deform sufficiently, for example to conform to the shape of a surface and to fold at least partially to fit on the fluidic component 4.

The substrate comprises, at a first end, a first element 10 and, at its second end, a second element 11.

The deformable intermediate portion 12 joins its first element 10 to its second element 11 and extends, at rest, along its longitudinal axis (X).

This portion 12 is advantageously flexurally deformable, and acts like a hinge, between the first element 10 and the second element 11, about an axis that is perpendicular to its longitudinal axis (X) and located in the carrier plane. It may also be torsionally deformable about its longitudinal axis (X). The flexural deformation must be sufficient to allow the second element to be placed above the first element. The torsional deformation must be at least sufficient to adjust the position of the second element with respect to the first element. Its deformability is advantageously elastic, allowing it to return to its rest state without needing to be forced mechanically to do so.

The first element 10 and the second element 11 of the device may take the form of a pad.

The two elements 10, 11 may be of conformable nature, allowing them to best conform to a surface, and notably to that surface of the component on which they are intended to be placed.

The deformable portion 12 of the substrate may take the form of an intermediate junction strip joining the two pads, and may thus form a conductive web.

The instrumented device 1 may be produced using a single one-piece substrate. It may then comprise a single strip or ribbon made of a supple and flexible, semi-rigid or articulated plastic cut to a suitable profile to form the first element, the second element and the deformable portion joining the first element to the second element.

Cutting the strip thus allows two pads and the deformable portion 12 to be formed.

This strip may be made of a transparent, partially transparent or opaque material.

The strip comprises two opposite main faces, referred to as the upper face and lower face.

The first element 10 and the second element 11 of said device may each be instrumented (references 20, 21). The instrumentation 20, 21 of each element is advantageously carried out on one face, referred to as the functional face of the corresponding element of the device. The instrumentation allows the device to interact with the internal volume of the fluidic circuit of the component. The internal volume of the fluidic circuit may be filled with a fluid or placed under vacuum, and the instrumented device is intended to perform a measurement of at least one parameter, to stimulate or to react to the fluid placed in the fluidic circuit of the component, or to perform a measurement of at least one parameter, to stimulate or to react with respect to this volume under vacuum.

Non-limitingly, by virtue of its instrumentation, the device may be suitable for measuring parameters of electrical type (impedance, capacitance, resistance), chemical type, electrochemical type, optical type, thermal type or of another type (in transmission or in reflection), to electrically or optically stimulate a fluid.

To this end, the instrumented device 1 may specifically comprise at least one actuator, at least one effector, or at least one actuator/effector pair arranged, according to the circumstances, in a single instrumented element or in both instrumented elements.

By actuator, what is meant is a device capable of performing an action on command and of generating a stimulating signal.

By effector, what is meant is a device capable of reacting to a stimulation.

Non-limitingly, the actuator or effector may thus comprise one or more functional units.

Non-limitingly, by way of example, a functional unit may be an electrode, which is for example employed for an electrical measurement or a measurement of pH, a light-emitting diode, an optical sensor of CMOS type or equivalent, a thermistor, or an electrical resistor.

The composition and architecture of each functional unit of course depend on the function to be performed.

By way of example, for certain measurement functions, the instrumented device may comprise at least two functional units. This is the case of an optical detector that may comprise a light-emitting diode and a CMOS sensor or equivalent, of a pH sensor that comprises a reference electrode and a measurement electrode, and of an impedance sensor that comprises two electrodes. For a temperature sensor, the device may comprise a single functional unit formed of a thermistor. For an electrical stimulation, the device may comprise a single electrode.

The data collected by the instrumented device may be transmitted to a measuring unit 8.

Figure 12:
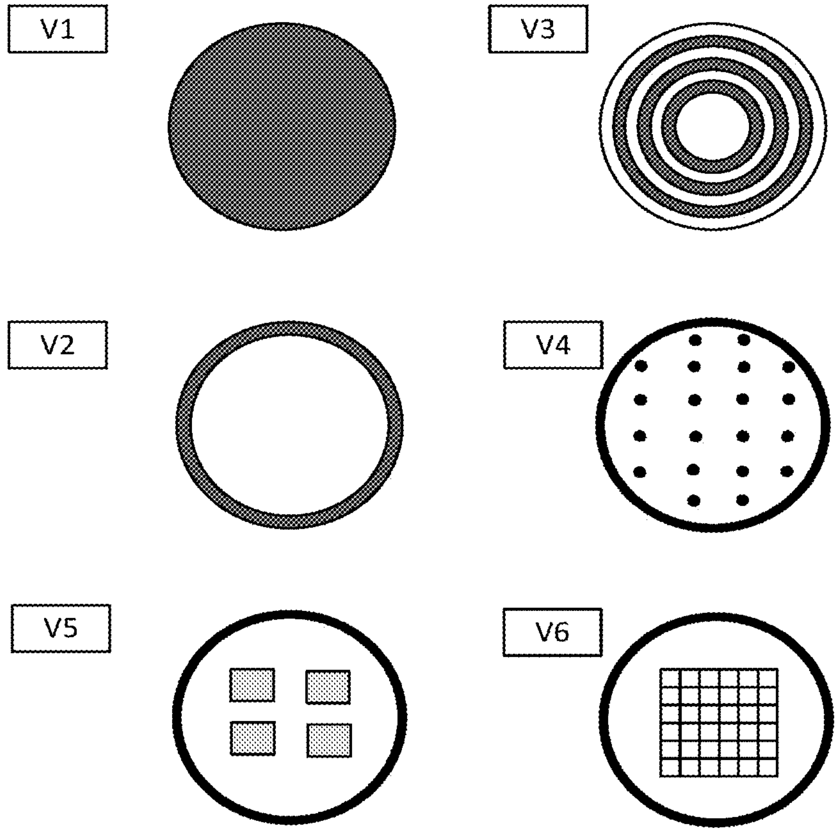
FIG. 12 shows a plurality of variant embodiments of an instrumented element employed in the instrumented device of the fluidic system of the invention.

FIG. 12 shows a plurality of examples of embodiment of an instrumented element of the device 1.

In embodiment V1, the instrumented element comprises a single electrode of solid disk shape.

In variant V2, the instrumented element comprises a single electrode of ring shape.

In variant V3, the instrumented element comprises a plurality of electrodes arranged in a plurality of concentric rings.

In variant V4, the instrumented element comprises a plurality of micro-electrodes organized into a plurality of rows and columns.

In variant V5, the instrumented element comprises a light source composed of at least one light-emitting diode.

In variant V6, the instrumented element comprises a sensor of CMOS type.

Depending on their architecture, each instrumented element may be partially transparent, non-transparent or completely transparent.

Figure 2A:
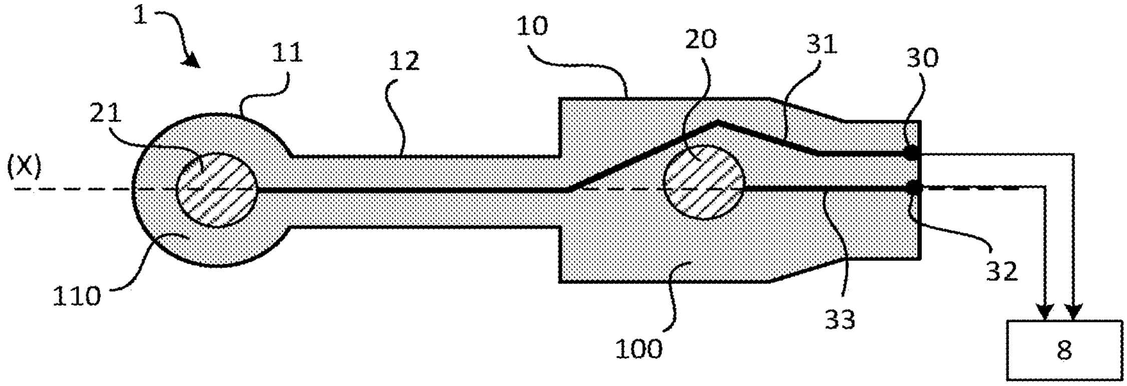
FIGS. 2A and 2B show, seen from above and seen in perspective, respectively, a first variant embodiment of the instrumented device employed in the fluidic system of the invention.
Figure 2B:
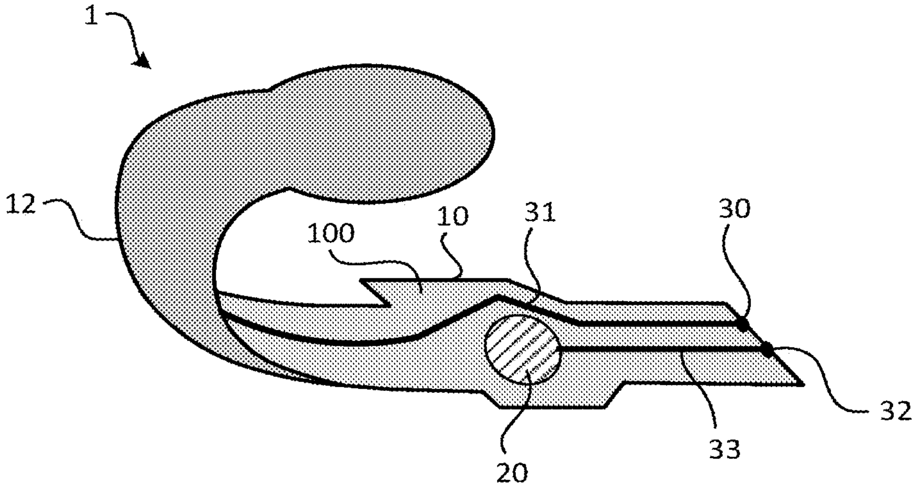

FIGS. 2A and 2B show a first variant embodiment of the device 1, produced from a single strip of material and both elements of which are instrumented 20, 21.

The first instrumented element 21 thus comprises at least one first functional unit and the second instrumented element 20 thus comprises at least one second functional unit. Non-limitingly, the first functional unit and the second functional unit may work together to measure one parameter (for example electrical measurement, measurement of pH, optical detector). A separate electrical conductor connects each functional unit of each instrumented element to one separate electrical connection point.

Figure 4A:
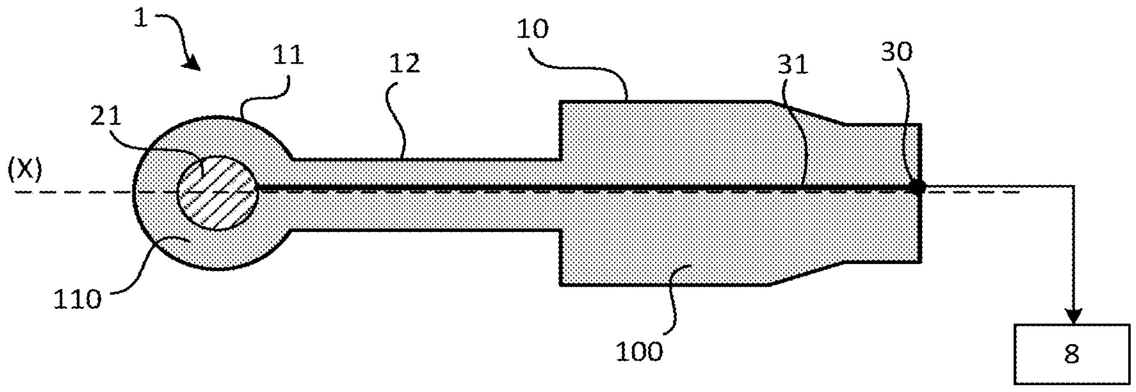
FIGS. 4A and 4B show, seen from above and seen in perspective, respectively, a second variant embodiment of the instrumented device employed in the fluidic system of the invention.
Figure 4B:
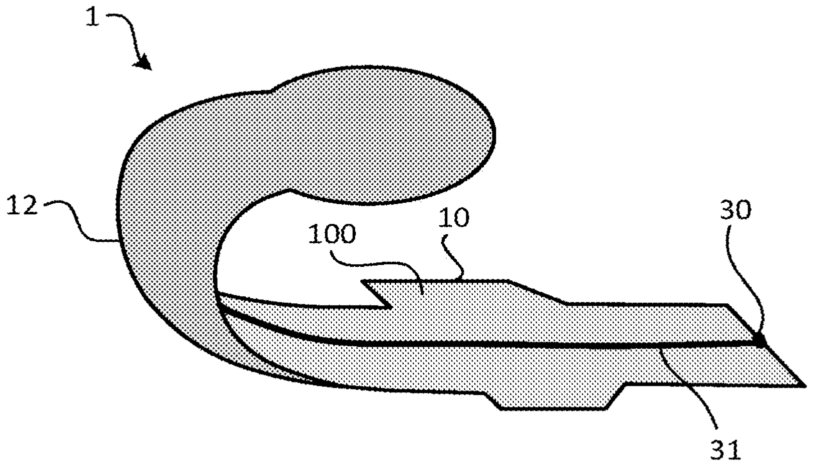

FIGS. 4A and 4B show a second variant embodiment of the instrumented device, produced from a single strip of material and a single element of which is instrumented 21. The instrumented element 21 comprises at least one functional unit connected by an electrical conductor 31 to an electrical connection point 30.

Each electrical conductor 31, 33 which connects a different functional unit of the first instrumented element 21 to a different electrical connection point 30, 32 located on the side of the first end of the instrumented device, is integrated into the deformable inteanediate portion 12 of the device.

There will thus be as many electrical conductors as there are functional units present in the instrumented device.

The functional units allowing the instrumentation of each element of the device 1 are for example arranged on the same face of the strip, its upper face for example, thus forming a functional face 100 of the first element 10 and a functional face 110 of the second element 11.

Each electrical conductor 31, 33 may take the form of a conductive track printed on one face of the strip of the measuring device, its upper face for example.

Figure 11:
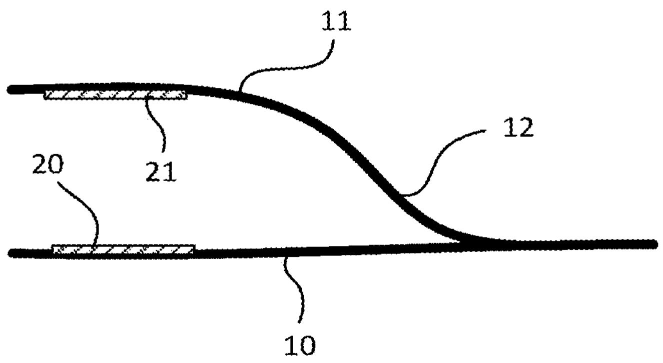
FIG. 11 shows one variant embodiment of the instrumented device employed in the fluidic system of the invention.

In FIG. 11, by way of variant embodiment, the instrumented device may be produced in a plurality of elements that are assembled together. It may for example comprise two supple, semi-rigid or articulated strips that are fastened to each other via one end only, a first strip bearing the first element at its free end and a second strip bearing the second element at its free end. The common portion fastening the two strips bears the electrical connection points.

Non-limitingly, each strip employed in the device (a single strip or a plurality depending on the embodiment) may be made of a material chosen from PET, PEN, KAPTON®, silicone, a polymer film, paper, and a fabric.

Each employed strip may have a thickness comprised between 70 and 400 μm, and advantageously comprised between 100 and 300 μm.

As one variant embodiment, the deformable portion 12 of the instrumented device may also take the form of a cord, joining the two elements 10, 11 to each other, each element for example taking the form of a pad.

The functional units of measurement electrode type and the electrical conductors may be produced using any known solution, and for example take the form of conductive inks deposited on their element and on the intermediate junction strip, by any known process, such as for example screen printing (with masking screen for example). To produce each electrode and the electrical conductors, processes for achieving metallization by evaporation, or sputtering processes, may also be envisioned. The use of electrolytic baths is another option envisionable for the production of the electrodes. For functional units of electronic type (diode, CMOS sensor, etc.), each element may comprise a carrier of PCB type to which the electronic component is soldered.

Non-limitingly, the instrumented device may comprise fastening means, configured to fasten its first element 10 and/or second element 11 to a surface. These fastening means may be of adhesive type and cover at least partially the functional face 100 of its first element 10 and/or the functional face 110 of its second element 11, on the periphery of the respective instrumentation thereof. Since the material employed to manufacture each element may be conformable, fastening them allows better conformation to the shape of the surface of the fluidic component 4 to which they are fastened. This is the case, for example, if the receiving surface of the component 4 is curved (concave or convex).

Figure 13:
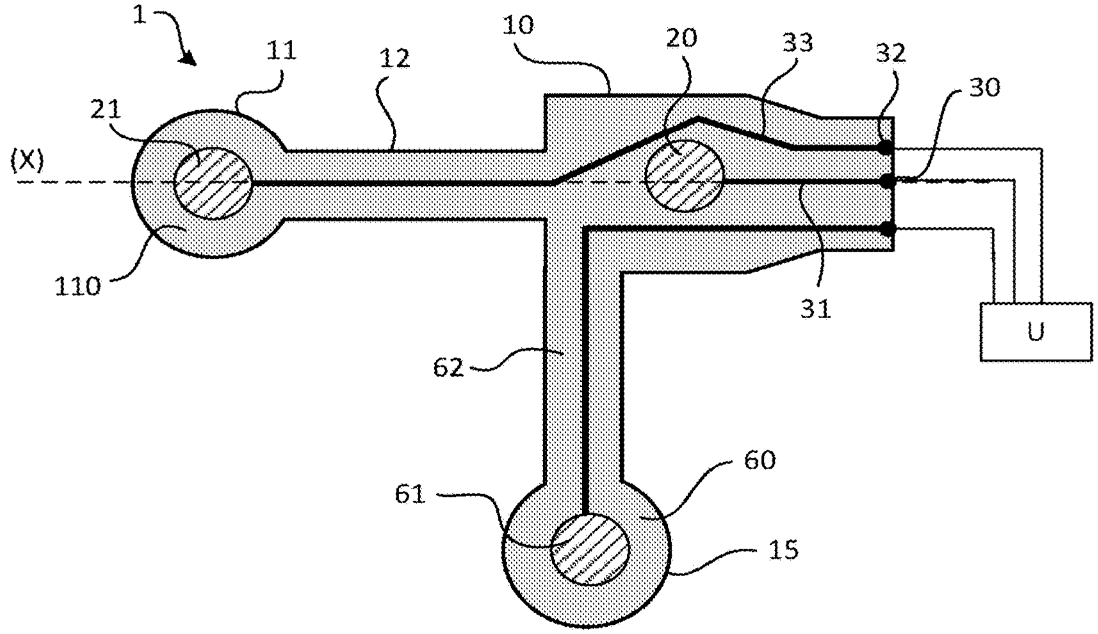
FIG. 13 shows one variant embodiment of the instrumented device employed in the fluidic system of the invention.

According to one variant embodiment shown in FIG. 13, the instrumented device may also comprise a third element 15 joined to the first element 10 via a second deformable portion 62 extending in a direction perpendicular to the axis (X) when the device is at rest. The second deformable portion 62 is arranged to flex with respect to the first element 10 about an axis parallel to its longitudinal axis (X). The third element 15 may also be instrumented 61 on its functional face 60 and comprise one or more conductive tracks dedicated to its functional units. Of course, it will be understood that this principle may be extended to other architectures, the device possibly thus comprising a higher number of branches, with different orientations.

Figure 3A:
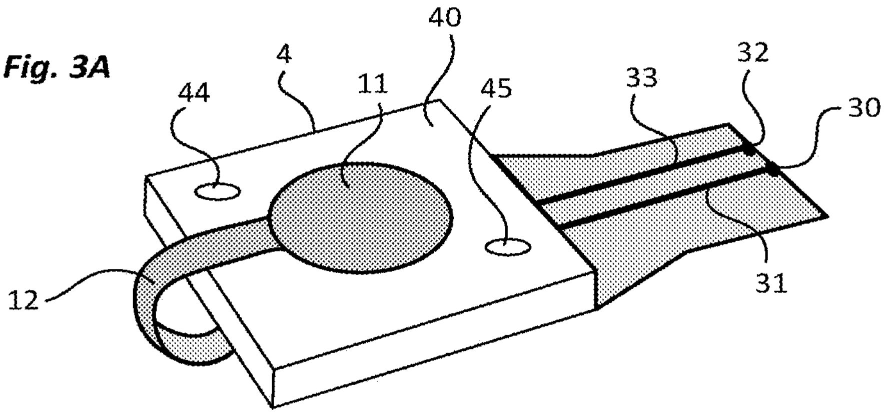
FIGS. 3A and 3B show a first embodiment of the fluidic system of the invention, said system being equipped with an instrumented device such as shown in FIGS. 2A and 2B, which device is fitted to the fluidic component of FIG. 1.
Figure 3B:
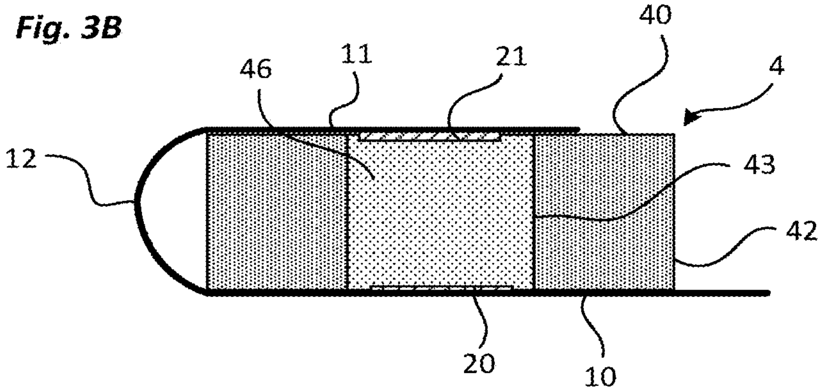

In FIGS. 3A and 3B, the instrumented device 1 has been fitted on the fluidic component 4 to form a first variant embodiment of the system of the invention. It corresponds to the device described with reference to FIGS. 2A and 2B. Both its elements are instrumented. Its first element 10 is applied via its functional face 100 against the lower face 41 of the component 4, on the periphery of the first aperture 430, to close this aperture 430, advantageously in a seal-tight manner. Its instrumentation 20 is oriented toward the interior of the cavity of the component, for example in order to make contact with the fluid 46 present in the cavity 43 if the functional unit is an electrode. Its second element 11 is applied via its functional face 110 against the upper face 40 of the component 4, on the periphery of the second aperture 431, its instrumentation 21 being oriented toward the interior of the cavity 43, for example in order to make contact with the fluid present in the cavity of the component.

Figure 5A:
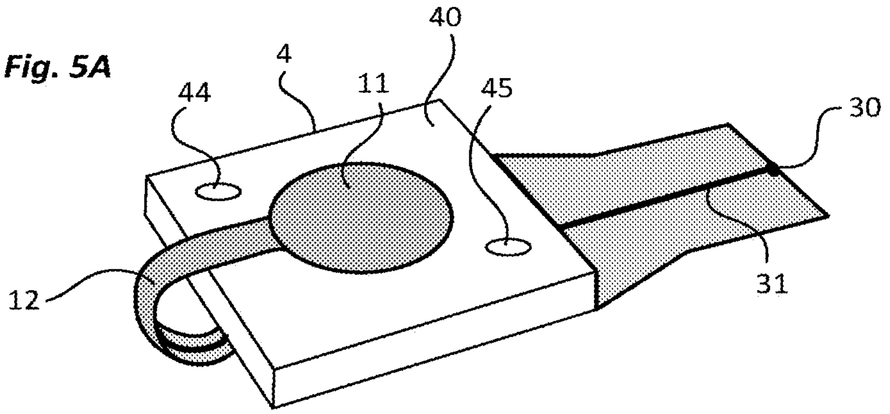
FIGS. 5A and 5B show a second embodiment of the fluidic system of the invention, said system being equipped with an instrumented device such as shown in FIGS. 4A and 4B, which device is fitted to the fluidic component of FIG. 1.
Figure 5B:
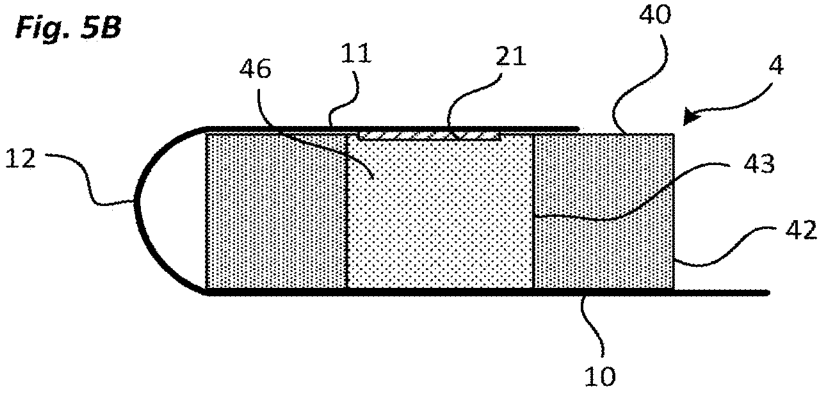

In FIGS. 5A and 5B, the instrumented device 1 is fitted on the fluidic component 4. It corresponds to the device described with reference to FIGS. 4A and 4B, and forms a second variant of the system of the invention. As single of its two elements 10, 11 is equipped with an instrumentation.

Its first element 10 is applied via its functional face 100 against the lower face 41 of the component 4, on the periphery of the first aperture 430, and closes said aperture 430, advantageously in a seal-tight manner. Its second element 11 is applied via its functional face 110 against the upper face 40 of the component 4, on the periphery of the second aperture 431, its instrumentation 21 oriented toward the interior of the cavity 43. Depending on the function to be performed, the instrumentation of the device may or may not make contact with the fluid 46 present in the cavity of the component.

In both configurations, the deformable portion 12 of the device 1 thus allows the thickness of the component 4 to be circumvented to ensure the link between the first element 10 and the second element 11.

The adhesive means of the instrumented device are configured to fasten the first element 10 and the second element 11 via adhesion of their functional face 100, 110 against the lower face 41 and upper face 40 of the component 4, respectively. This adhesion may be sufficient to ensure a seal-tightness of each aperture of the fluidic circuit, with respect to the exterior. Just as for the first aperture 430 of the first element 10, the application of the second element 11, via its functional face 110, against the upper face 40 of the component 4 may specifically allow the seal-tightness of the second aperture 431 of the fluidic circuit to be ensured.

Figure 6:
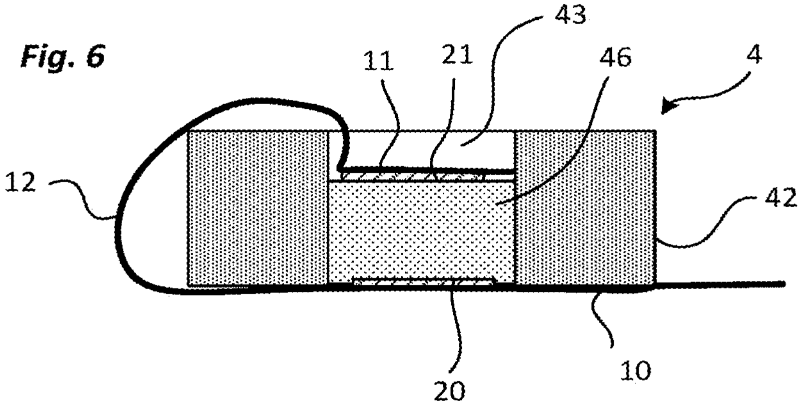
FIG. 6 shows one variant embodiment of the fluidic system of the invention.

According to one particular aspect of the invention, as shown in FIG. 6, the second element 11 may be placed inside the cavity 43 so as to be embedded therein.

Figure 7:
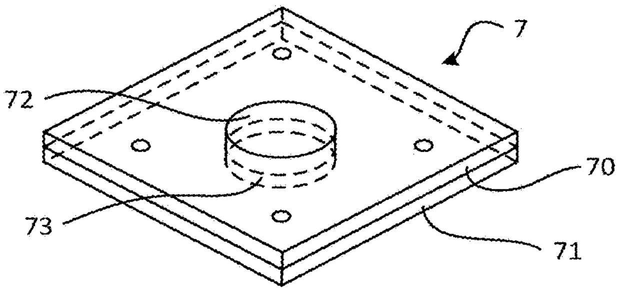
FIG. 7 shows one variant embodiment of a fluidic component employed in the fluidic system of the invention.
Figure 8:
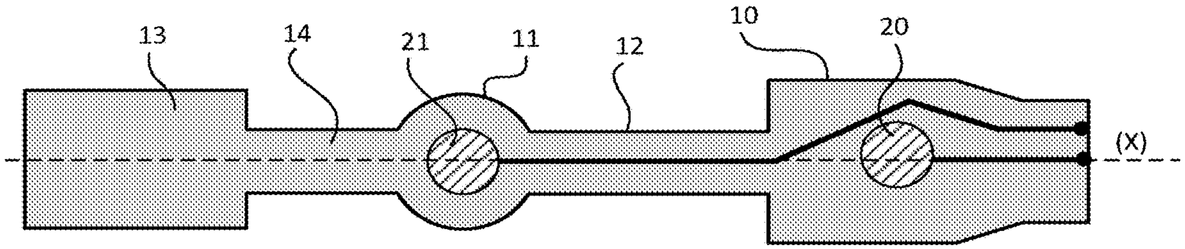
FIG. 8 shows another variant embodiment of an instrumented device employed in the fluidic system of the invention.

In one variant embodiment shown in FIG. 7, the fluidic component 7 may comprise two superposed layers 70, 71, through which a through-cavity is formed. The instrumented device thus has the configuration of FIG. 8, allowing it to fit on this fluidic component 7. The instrumented device comprises an extension 13 produced in such a way as to extend its second carrier 11, along the axis (X). This extension 13 is produced, in an identical manner, by cutting the strip of the device. A second deformable portion 14 allows the extension of the second carrier 11 to be separated.

Figure 9:
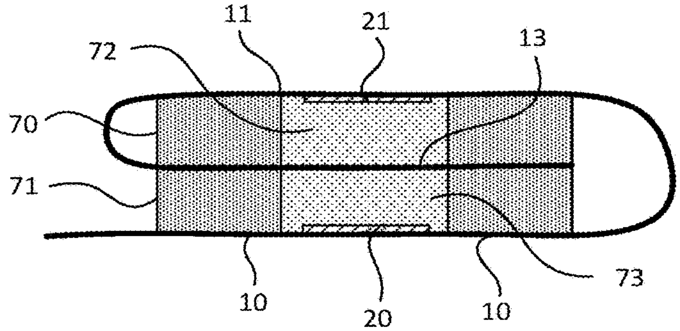
FIG. 9 shows another variant embodiment of the fluidic system of the invention, which is produced using the fluidic component of FIG. 7 and the instrumented device of FIG. 8.

With reference to FIG. 9, the extension 13 may be integrated into the component in such a way as to lie between its two layers 70, 71, to form a membrane separating the cavity into two spaces 72, 73 of the fluidic component 7.

The second deformable portion 14 of the strip of the instrumented device may be folded to apply the second carrier 11 against the upper face of the component 7 and the first deformable portion 12 of the strip may be folded to apply the first carrier 10 against the lower face of the component. The strip of the measuring device thus follows a spiral profile.

Figure 10:
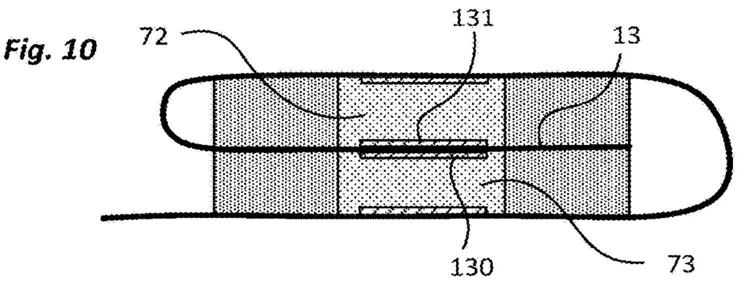
FIG. 10 shows one variant embodiment of the fluidic system of FIG. 9.

In FIG. 9, the extension 13 may form a simple membrane between the two spaces. This membrane may be porous and/or filtering, thus allowing a fluid to pass partially or completely from one space to the other. As a variant embodiment illustrated in FIG. 10, the extension 13 may also bear one electrode 130 arranged on a single face, or two electrodes 130, 131 on its two opposite faces, each oriented toward the interior, of the lower space of the fluidic component 7 and of the upper space of the fluidic component 7, respectively. As for the preceding embodiments, in this variant embodiment, the instrumented device may take the form of a single suitably cut strip of supple material.

Figure 14A:
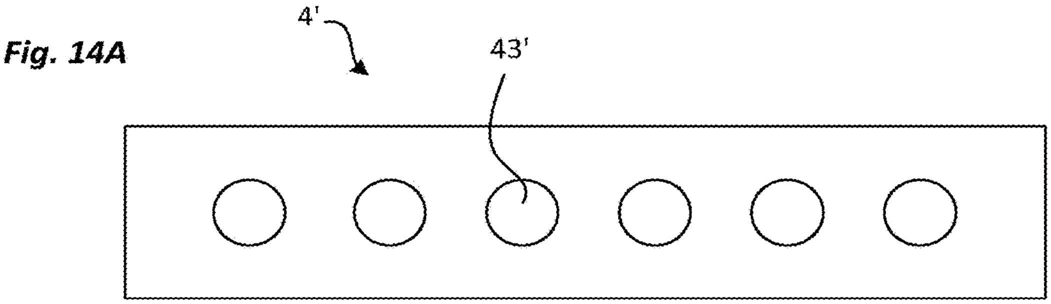
FIGS. 14A and 14B shows one variant embodiment of the fluidic component of the fluidic system of the invention and one variant embodiment of the instrumented device employed to fit on this fluidic component, respectively.
Figure 14B:
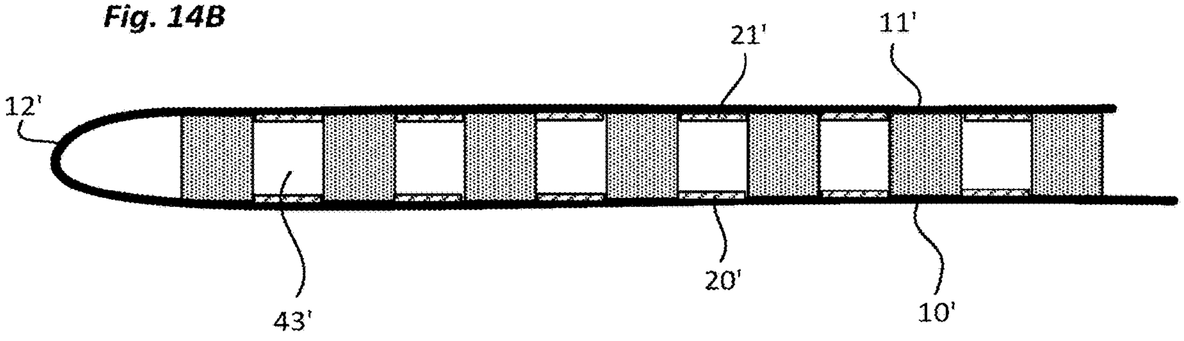

According to one variant embodiment illustrated in FIGS. 14A and 14B, the instrumented device may be suitable for being positioned on a fluidic component 4' that comprises a plurality of juxtaposed cavities 43'. It bears a plurality of juxtaposed instrumented elements 20' 21'. Electrical conductors are arranged to connect each of its functional units to a distinct connection point. A deformable portion 12' of the device joins its first elements 10' to its second elements 11'. All the connection points may be located together in connecting means to which a ribbon cable may be connected. In this configuration, the device may thus for example measure parameters of fluids present in various juxtaposed cavities 43', of a given fluidic component 4' or of a plurality of adjacent fluidic components. Certain cavities 43' may be independent or connected to one another by channels.

Figure 15:
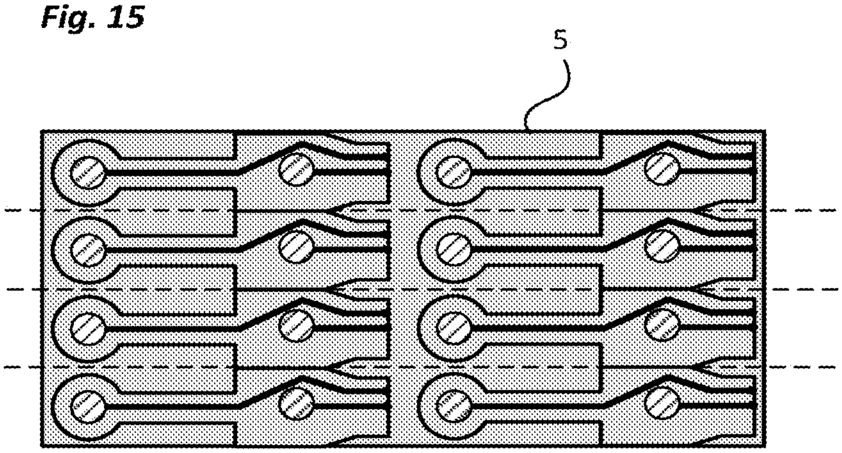
FIG. 15 illustrates a principle of manufacture of the instrumented device employed in the fluidic system of the invention.

FIG. 15 illustrates an example of manufacture of the instrumented device employed in the invention. The various functional units of the instrumented elements, the conductors and the connection points are printed/deposited on a carrier, such as a transparent film 5, made of supple material. The pattern is duplicated a plurality of times on the film so as to produce a plurality of devices on the same carrier. Next, the film is cut (laser cutting for example) to form the external outline of each device 1, i.e. its two elements and its deformable portion. This manufacturing principle notably allows manufacturing to be automated and a plurality of devices to be more easily manufactured using a given film of supple material.

The invention thus has many advantages, among which:

ease of use, notably permitted by a capacity for adaptation to fluidic components of various shapes;

independence with respect to the fluidic component, the instrumented device notably being able to be reusable;

ease of manufacture, at every stage (screen printing, laser cutting, etc.);

solution able to guarantee the seal-tightness of the component;

solution of low cost price.

The invention claimed is:

1. A fluidic system, comprising:

a fluidic component in which is implemented a fluidic circuit that includes at least a first aperture and a second aperture opening onto two distinct regions of the fluidic component; and an instrumented device fitted on the fluidic component, wherein the instrumented device comprises:

a first element fastened to the fluidic component to close the first aperture and a second element fastened to the fluidic component to close the second aperture, wherein the first element and/or the second element is instrumented with at least one actuator and/or an effector arranged to interact with an internal volume of the fluidic circuit;

at least one electrical connection point at the first element;

a deformable portion joining the first element to the second element; and at least one electrical conductor that connects the at least one electrical connection point to the at least one actuator and/or effector, the at least one electrical conductor and the at least one electrical connection point being distinct.

2. The fluidic system of claim 1, wherein each actuator or effector comprises at least one functional unit chosen from an electrode, a light- emitting diode, an optical sensor, an electrical resistor, and a thermistor.

3. The fluidic system of claim 2, wherein the at least one functional unit is an electrode, and the electrode comprises a conductive ink.

4. The fluidic system of claim 2, wherein each functional unit of the actuator or effector is connected to each electrical connection point by each electrical conductor.

5. The fluidic system of claim 4, wherein each electrical conductor and each electrical connection point are produced in the form of a conductive ink.

6. The fluidic system of claim 1, wherein the instrumented device comprises at least an elongate, supple, semi-rigid, or articulated substrate bearing the first element at a first end and the second element at a second end.

7. The fluidic system of claim 6, wherein the first element and the second element are made of a conformable material, to fit to the shape of the fluidic component in its the two distinct regions.

8. The fluidic system of claim 6, wherein the deformable portion is produced in the form of at least one strip of material joining the first element to the second element.

9. The fluidic system of claim 6, wherein the substrate comprising the first element, the second element, and the deformable portion is produced in a single part, in the form of a strip of supple plastic material.

10. The fluidic system of claim 9, wherein the strip is made of a material chosen from polyethylene terephthalate, polyethylene naphthalate, silicone, a polymer film, paper, and a fabric.

11. The fluidic system of claim 6, wherein the substrate comprising the first element, the second element, and the deformable portion further comprises two flexible and supple, semi-rigid, or articulated strips adhesively bonded to each other via a common portion and forming two strands each bearing, respectively, at their free end, the first element and the second element.

12. The fluidic system of claim 11, wherein each strip is made of a material chosen from polyethylene terephthalate, polyethylene naphthalate, silicone, a polymer film, paper, and a fabric.

13. The fluidic system of claim 1, wherein the fluidic component has a right slab shape, and wherein the first aperture and the second aperture open onto two opposite faces.

14. The fluidic system of claim 13, wherein:

the fluidic component further comprises two superposed layers, a first layer and a second layer, the fluidic circuit further comprising a through-cavity that passes through the two superposed lavers, and that communicates on the one hand with the first aperture, and on the other hand with the second aperture, and the instrumented device further comprises an extension connected to the second element via a second deformable portion, the extension being arranged between the two superposed lavers of the fluidic component to form a membrane separating the through-cavity into two distinct spaces.

* * * * *